G. M. HOHL.
AUTOMATIC HOT BLAST TEMPERATURE CONTROL MECHANISM.
APPLICATION FILED MAR. 28, 1921.
1,435,119.
Patented Nov. 7, 1922.
2 SHEETS—SHEET 1.
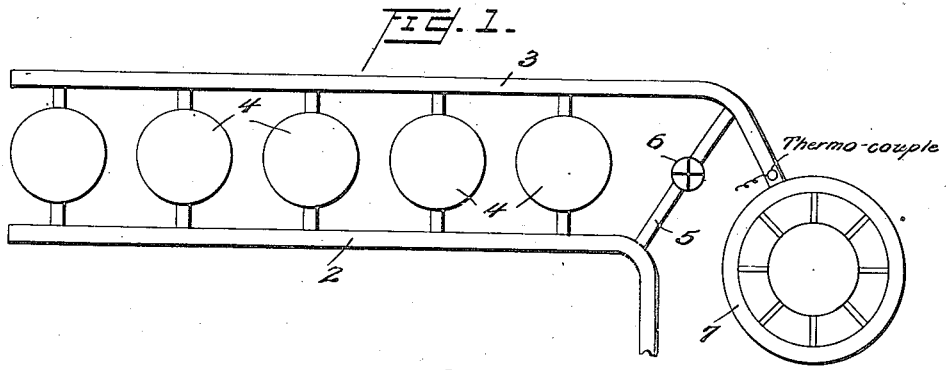
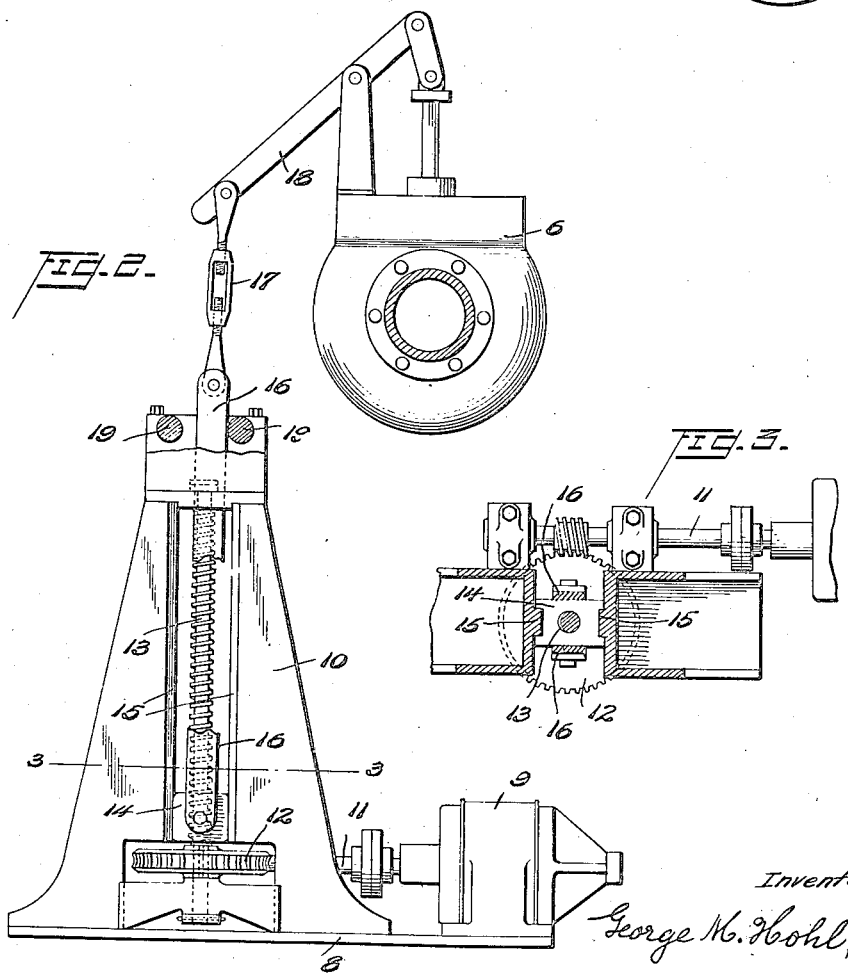
Inventor
George M. Hohl,
By Watson, Coit, Morse & Grindle,
Att'ys

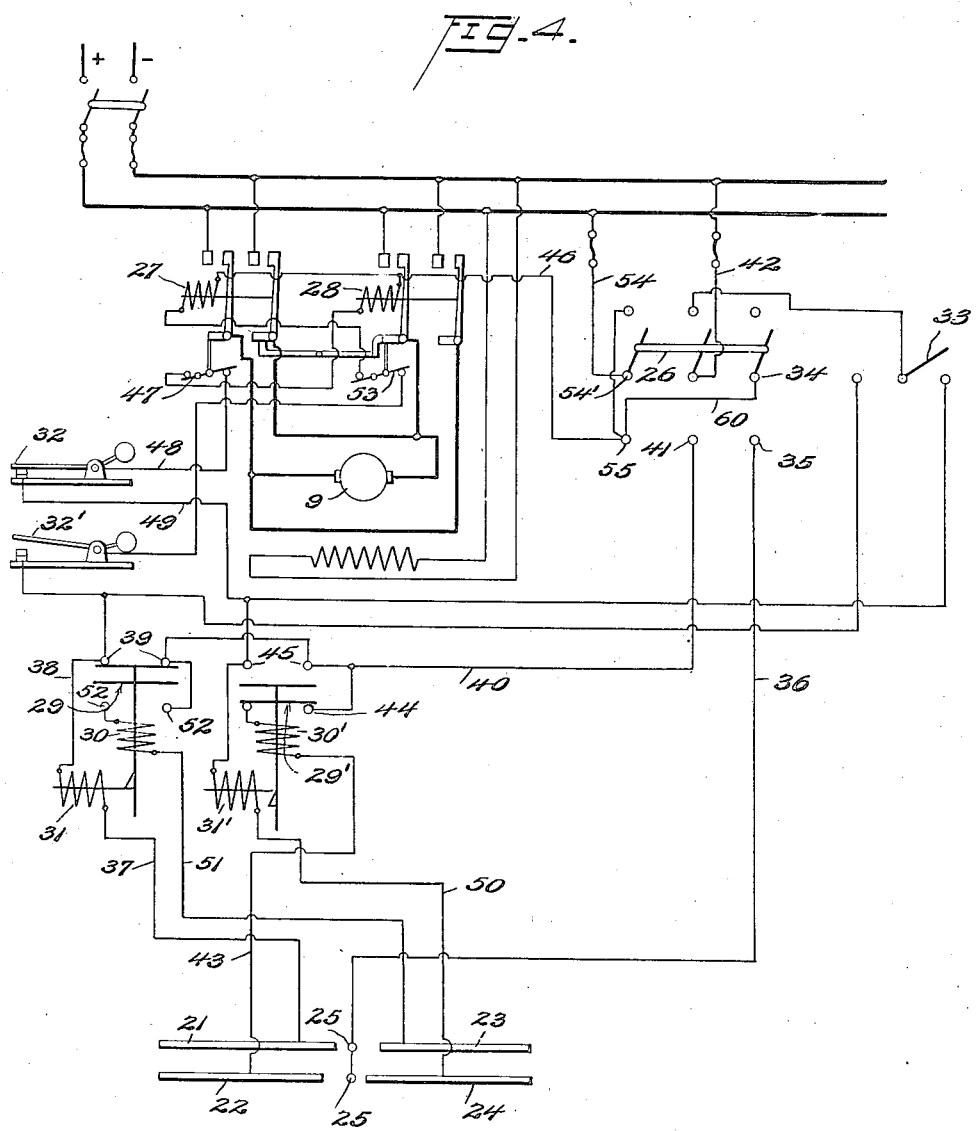

Patented Nov. 7, 1922.

1,435,119

UNITED STATES PATENT OFFICE.

GEORGE M. HOHL, OF BETHLEHEM, PENNSYLVANIA, ASSIGNOR TO BETHLEHEM STEEL COMPANY, A CORPORATION OF PENNSYLVANIA.

AUTOMATIC HOT-BLAST TEMPERATURE-CONTROL MECHANISM.

Application filed March 28, 1921. Serial No. 456,227.

*To all whom it may concern:*

Be it known that I, GEORGE M. HOHL, a citizen of the United States, residing at Bethlehem, county of Northampton, State of Pennsylvania, have invented certain new and useful Improvements in Automatic Hot-Blast Temperature-Control Mechanism, of which the following is a specification.

The present invention relates to automatic temperature controlling systems, and is particularly designed to regulate the temperature of the hot blast fed to a blast furnace, so as to maintain said temperature within predetermined narrow limits.

While capable of other uses, the invention is particularly adapted to be employed in connection with a blast furnace equipment already in use. The equipment referred to comprises a cold blast main, a hot blast main, a series of stoves connected in parallel between the mains, a by-pass between the mains in which is located a manually operated mixing valve, and a thermo-couple adjacent the delivery end of the hot blast main connected to indicating and recording instruments by a potentiometer controlling system. Heretofore the mixing valve has been operated by an attendant to by-pass more or less cold air to the hot blast as the pyrometer-controlled indicator showed a rise above or a fall below the desired temperature. The general object and purpose of this invention is to provide a motor controlling system for operating the mixing valve which may be connected with switch mechanism operated by a suitable part of the pyrometer equipment, such as the registering mechanism of said equipment. More particular objects and advantages of the invention will appear as the description proceeds.

Referring to the accompanying drawings:

Figure 1 is a diagrammatic representation of a blast furnace equipment;

Figure 2 is a vertical sectional view through the operating gear of the mixing valve;

Figure 3 is a horizontal section thereof on the line 3—3 of Figure 2; and

Figure 4 is a diagrammatic view of the electric circuits and mechanism for controlling the operation of the mixing valve.

Referring to the drawings, Figure 1 shows, in a diagrammatic way, the blast furnace equipment with which my invention is designed to be used. This equipment comprises a cold blast main 2, a hot blast main 3, a series of stoves 4 between the cold and hot blast mains, a by-pass 5, in which is located a mixing valve 6, and a thermocouple located adjacent the delivery end of the hot blast main at the blast furnace 7. The equipment further comprises a potentiometer system connected with the thermocouple, together with suitable indicating and recording apparatus controlled thereby. I have not illustrated any particular potentiometer controlled indicating and recording system, as such systems are well known in the art. I may say, however, that the system which constitutes my invention has been designed with particular reference to the potentiometer-pyrometer equipment put out by the Leeds and Northrup Company of Philadelphia, Pennsylvania, and is described herein as connected with the recording mechanism of this equipment.

Referring to Figures 2 and 3 for a description of the specific motor-operated valve gear which forms an element of my system, the numeral 8 designates a base plate to which is bolted an electric motor 9 and a stand 10. The motor drives a worm shaft 11, which engages a worm wheel 12 fast on a vertical shaft 13, the latter being journaled at its upper and lower ends in bearings fixed to the stand. Shaft 13, as shown in Figure 2, is screw threaded substantially throughout its entire length and has mounted thereon an internally threaded nut 14, which is adapted to slide on vertical guides or keys 15 formed on opposing faces of the two pedestals constituting the stand. A pair of links 16 have their lower ends pivoted to opposite sides of the nut and their upper ends connected by a cross rod, on which is pivoted the lower end of a turnbuckle 17. The upper end of the turnbuckle is pivoted to one arm of a lever 18, the other arm thereof being connected by a link with the mixing valve 6. Links 16 are guided between a pair of rolls 19 journaled in the top of stand 10. When the motor rotates in one direction or the other, nut 14 is driven up or down, as the case may be, thereby closing or opening the valve. Due to the reduction gear between the motor and valve, the movement of the valve is very slow with relation to that of the motor, thereby allowing the variations of temperature of the hot blast produced by movements of the valve to be communicated to the motor controlling system and control the motor before the latter has moved the valve beyond the point at which it ought to be set in order to produce the desired hot blast temperature. This relatively slow action of the valve produces an accurate setting of the valve and prevents oversetting and unnecessary vibratory operation thereof.

Referring to Figure 4, the motor 9 for operating the mixing valve 6, is controlled, through relays and electromagnetic switch mechanism, by a set of rotating contact segments which are designed to be operated by the recording mechanism of the Leeds and Northrup potentiometer-pyrometer equipment referred to above. These contact segments are designated on Figure 4, which shows a developed plan thereof, by the numerals 21, 22, 23 and 24. They rotate from a normal position in one direction or the other, as the temperature of the hot blast rises above or falls below the temperature at which the apparatus is set to maintain said blast, and are adapted to engage stationary contacts 25. Energy for operating the system is supplied from direct current mains through a three pole double throw switch 26, which is closed in its down position when the system is subjected to automatic control and is closed in its up position when it is desired to control the system manually. The motor is shown as a shunt motor having its field permanently connected across the bus bars. The circuits through the armature of the motor are controlled by a pair of mechanically and electrically interlocked switches 27 and 28, the circuits of said switches being respectively controlled by a pair of relays 29 and 29', which are under the direct control of the rotating contact segments. The relays each comprise a closing coil 30, 30' and a trip coil 31, 31'. The system further includes a pair of limit switches 32 and 32' which are open only when the mixing valve is in full closed position or in full open position, respectively, and a single pole double throw switch 33, which is used for manually controlling the system.

Assuming the parts to be in the position illustrated by the drawings, that is, with the mixing valve open and the motor controlling circuits deenergized, to subject the system to automatic operation, the switch 26 is thrown into its lower position. Now suppose the temperature of the hot blast decreases. The potential of the thermocouple will immediately fall, thereby setting in operation the potentiometer system and causing actuation of the recording mechanism of the equipment. The rotary contacts will accordingly be moved in a direction, say, to bring the segments 21 and 22 into engagement with the stationary contacts 25. The contact 21 will come into engagement first, thereby closing a circuit from the positive main, through conductor 54, switch contacts 54', 55, conductor 60, switch contacts 34 and 35, conductor 36, stationary contact 25, segment 21, conductor 37, trip coil 31, contacts 39, conductor 40, switch contact 41 and conductor 42 to the negative main. The closing of this circuit energizes trip coil 31, which releases and opens switch 29, thereby breaking the trip coil circuit at contacts 39 and closing the circuit of coil 30 at contacts 52. Immediately after this, contact segment 22 engages stationary contact 25, closing a circuit through coil 30' of switch 29', this circuit being from the positive main through conductor 54, switch contacts 54', 55, conductor 60, switch contacts 34 and 35, conductor 36, contact 25, segment 22, conductor 43, coil 30', contacts 44, conductor 40, contact 41 and conductor 42 to the negative main. Coil 30' therefore raises its armature, opening contacts 44 and bridging contacts 45, thereby closing the following circuit through electromagnetic switch 28; positive main, conductor 54, contacts 54', 55, conductor 46, coil of switch 28, electric interlock switch 47, conductor 48, limit switch 32, conductor 49, contacts 45, conductor 40, contact 41 and conductor 42 to the negative main. The energization of this circuit closes switch 28 connecting the armature of the motor across the power mains in such way as to cause the motor to rotate in the proper direction to drive the nut 14 upwards, thereby gradually closing the mixing valve. As this valve slowly throttles the cold air bypass, the temperature of the hot blast rises, causing actuation of the recording mechanism and the rotary contacts operated thereby in the reverse direction. The motor will continue closing the valve until the temperature of the hot blast rises to the degree corresponding to the position of the rotary contacts where the segments 21 and 22 have left the stationary contacts and one of the latter is in engagement with segment 24, whereupon the following circuit through trip coil 31' will be closed; positive main, conductor 54, switch contacts 54', 55, conductor 60, switch contacts 34 and 35, conductor 36, contact 25, segment 24, conductor 50, trip coil 31', contacts 45, conductor 40, contact 41 and conductor 42 to the negative main. Trip coil 31' thus being energized, releases switch 29' and the latter drops opening the circuit through the coil of switch 28 which in turn opens the armature circuit, stopping the motor. If the temperature of the hot blast increases above this point, segment 23 will be brought into engagement with contact 25, closing the following circuit: positive main, conductor 54, contacts 54', 55, conductor 60, contacts 34 and 35, conductor 36, contact 25, segment 23, conductor 51, coil 30, contacts 52, conductor 40, contact 41 and conductor 42 to the negative main. The consequent energization of coil 30 raises the movable contacts of switch 29, opening the circuit of said coil and closing a circuit through the coil of switch 27, the movable contacts of switch 29 being retained in raised position by the latch. The circuit through the coil of switch 27 may be traced as follows: positive main, conductor 54, switch contacts 54', 55, conductor 46, coil of switch 27, electric interlock switch 53, limit switch 32', contacts 39, conductor 40, contact 41 and conductor 42 to the negative main. Switch 27 closes the armature circuit in such a way that the current flows therethrough in reverse direction, thereby reversing the direction of rotation of the motor, and causing it to lower the nut 14 and move the mixing valve towards open position. This operation will continue until the temperature of the hot blast has fallen to a point corresponding to the position of the contact segments where the segments 23 and 24 have left the stationary contacts 25 and the upper one of the latter has moved into engagement with segment 21. In this position, the circuit through trip coil 31, traced above, is closed, energizing said coil and releasing the latch holding the movable contacts of switch 29 in raised position. The latter thereupon, fall, opening the circuit through the coil of switch 27, which permits said switch to open, stopping the motor.

If at any time during the operations outlined above, the motor should move the valve to full closed position, limit switch 32 will be opened, thus stopping the motor; or if the valve should be moved to full open position, limit switch 32' will be opened, stopping the motor. These switches may be operated by any suitable part of the valve operating gear, so as to be opened respectively when the valve is moved to either of its extreme positions and closed at all other times.

When for any reason it is desired to control the valve manually, the switch 26 is thrown to its upper position, disconnecting the relays 29 and 29' and putting the electromagnetic switches 27 and 28 under the control of the single pole double throw switch 33, the latter controlling connections shunting the contacts of switches 29 and 29'.

Having thus described the invention what I claim as new and desire to secure by Letters Patent is:

1. In a blast furnace equipment having a cold air main, a hot blast main, a by-pass between said mains, a valve in said by-pass and a thermocouple in said hot blast main connected with a translating device, the combination of an electric motor connected with said valve to actuate the same, a pair of contact segments controlled by said translating device, a stationary contact for said segments, and means for operating said motor in one direction or the other according as one or the other of said segments is moved into engagement with said stationary contact.

2. In a blast-furnace equipment, having a cold air main, a hot blast main, a by-pass between said mains, a valve in said by-pass, and a thermocouple in said hot blast main connected with a translating device; the combination of an electric motor connected with said valve to actuate the same, a pair of contact segments controlled by said translating device, a stationary contact for said segments, means for operating said motor in one direction or the other according as one or the other of said segments is moved into engagement with said stationary contact, and means for opening the motor circuit when said valve is in either of its extreme positions.

3. In a blast-furnace equipment, having a cold air main, a hot blast main, a by-pass between said mains, a valve in said by-pass and a thermocouple in said hot blast main connected with a translating device, the combination of an electric motor connected with said valve to actuate the same and switch mechanism controlled by said translating device for operating said motor in one direction or the other according as the temperature of the hot blast rises above or falls below a predetermined value.

4. In a blast-furnace equipment, having a cold air main, a hot blast main, a by-pass between said mains, a valve in said by-pass and a thermocouple in said hot blast main connected with a translating device, the combination of an electric motor connected to actuate said valve, contact mechanism operated by said translating device and controlling said motor, said contact mechanism operating when moved in either direction from a central position successively to stop said motor and reverse its direction of rotation.

5. In an automatic temperature controlling system for maintaining the hot blast fed to a blast furnace within predetermined narrow limits of temperature, means for admitting cold air to the hot blast, a motor for operating said means, an electromagnetic switch for closing a circuit through said motor for operation thereof in one direction, a second electromagnetic switch for closing a circuit through said motor for operation thereof in the reverse direction, a relay controlling the first electro-magnetic switch, a second relay controlling the second electro-magnetic switch, a closing and a releasing coil for each relay, a pair of rotatable contact segments conected respectively with the closing coil of the first relay and the releasing coil of the second relay, a second pair of rotatable contact segments connected respectively with the closing coil of the second relay and the releasing coil of the first relay, stationary contacts connected with a source of energy adapted to successively engage said rotatable contacts, and means responsive to temperature changes of the hot blast for rotating said contact segments.

6. In an automatic temperature controlling system for maintaining the hot blast fed to a blast furnace within predetermined narrow limits of temperature, the combination of means for admitting cold air to the hot blast, a motor for operating said means, an electromagnetic switch for closing a circuit through said motor for operation thereof in one direction, a second electro-magnetic switch for closing a circuit through said motor for operation thereof in the reverse direction, a relay controlling the first electromagnetic switch, a second relay controlling the second electromagnetic switch, a closing and a releasing coil for each relay, rotatable contact segments connected with said closing and releasing coils and operating when moved in either direction from a central position to successively close the circuits through the releasing coil of one relay and the closing coil of the other relay, the circuits of the closing and releasing coils of each relay having gaps therein which are opened and closed respectively when the relay is closed and, vice versa, are closed and opened respectively when the relay is open, a switch in circuit with each of said electro-magnetic switches and adapted to be opened respectively when said valve is in full open or closed position, and means responsive to temperature variations of the hot blast for operating said rotatable contact segments.

7. In a blast-furnace equipment, having a cold air main, a hot blast main, a by-pass between said mains, a valve in said by-pass, and a thermocouple in said hot blast main connected with a translating device, the combination of an electric motor controlled by said translating device, a worm driven by said motor, a worm wheel engaging said worm, a screw shaft driven by said worm wheel, a nut on said shaft guided for longitudinal movement thereof, links pivoted to said nut, a lever connected with said valve and a connection between said lever and links.

8. In an automatic temperature controlling system for regulating the temperature of the blast fed to a blast furnace, an electric motor responsive to variations of the hot blast temperature, a valve for controlling the temperature of the hot blast, and connections between said motor and valve including a screw shaft, a nut on said shaft guided and constrained to move longitudinally thereof, a lever having one arm connected with said valve, connections between the other arm of said lever and said nut, and reducing gearing between said motor and said shaft.

9. In an automatic temperature system for blast furnaces, a base plate, a motor and a stand bolted on said plate, said stand including a pair of spaced pedestals, a vertical screw shaft journaled at its upper and lower ends in said stand and extending centrally between the pedestals thereof, a nut on said shaft slidably mounted on the opposing faces of said pedestals, a worm wheel on said shaft adjacent the lower end thereof, a worm shaft driven by said motor and engaging said worm wheel, a pair of links having their lower ends pivoted to opposite sides of said nut, a pair of antifriction rolls journaled at the top of said stand engaging opposite sides of said links to limit the swinging movement thereof, a valve and casing, a lever fulcrumed on said casing and having one arm connected with said valve, and an adjustable connection between the other arm of said lever and the upper ends of said links.

In testimony whereof I hereunto affix my signature.

GEORGE M. HOHL.